(12) United States Patent
Kotlow et al.

(10) Patent No.: US 6,996,732 B2
(45) Date of Patent: Feb. 7, 2006

(54) METHOD OF AND APPARATUS FOR ACHIEVING "WATCH DOG" FUNCTIONS IN MICROCONTROLLERS AND MICROCOMPUTERS AND THE LIKE, REQUIRED TO SHUT DOWN FOR EXTENDED PERIODS OF TIME FOR ENERGY-CONSERVATION PURPOSES

(75) Inventors: Daniel B. Kotlow, Cherry Hill, NJ (US); Carlos A. Barberis, Haverhill, MA (US)

(73) Assignee: Micrologic, Inc., Westborough, MA (US)

( * ) Notice: Subject to any disclaimer, the term of this patent is extended or adjusted under 35 U.S.C. 154(b) by 661 days.

(21) Appl. No.: 10/237,363

(22) Filed: Sep. 7, 2002

(65) Prior Publication Data

US 2004/0210785 A1    Oct. 21, 2004

(51) Int. Cl.
  *G06F 1/04*   (2006.01)
  *G06F 1/30*   (2006.01)
  *G06F 11/00*  (2006.01)
  *G06F 11/22*  (2006.01)

(52) U.S. Cl. .................... 713/324; 713/300; 713/320; 713/322; 713/323; 713/600; 713/601; 714/23; 714/33

(58) Field of Classification Search .................... None
  See application file for complete search history.

(56) References Cited

U.S. PATENT DOCUMENTS

| | | | | |
|---|---|---|---|---|
| 5,233,613 A | * | 8/1993 | Allen et al. | 714/23 |
| 6,047,380 A | * | 4/2000 | Nolan et al. | 713/324 |
| 6,393,589 B1 | * | 5/2002 | Smit et al. | 714/33 |
| 6,405,328 B1 | * | 6/2002 | Vasanoja | 714/23 |
| 6,523,126 B1 | * | 2/2003 | Brabenac | 713/323 |
| 6,587,966 B1 | * | 7/2003 | Chaiken et al. | 713/2 |

* cited by examiner

*Primary Examiner*—A. Elamin
*Assistant Examiner*—James K. Trujillo
(74) *Attorney, Agent, or Firm*—Rines and Rines

(57) ABSTRACT

A watchdog timer circuit modified to operate during periods of microcomputer shut-down or sleeping, as for energy conservation purposes, controlled by an independent external rectangular-wave signal for inhibiting watchdog timer reset signal generation for the microcomputer during such shut-down periods and until a wake-up signal is generated at the end of such microcomputer sleeping, whereupon the watchdog circuit will generate a reset signal in the absence of proper microcomputer operation.

6 Claims, 1 Drawing Sheet

Figure 1:
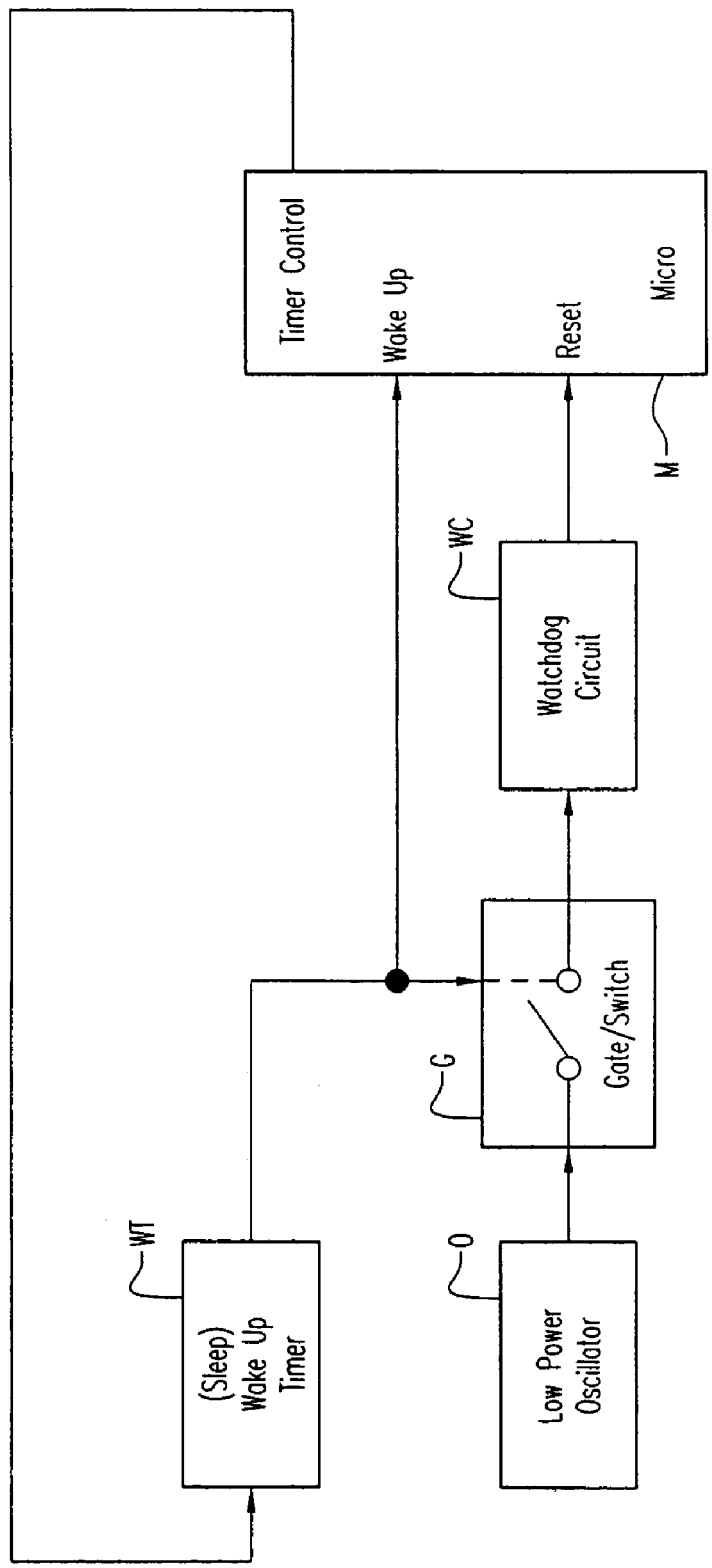

Watchdog Configuration for a System That "Sleeps" for Extended Time Periods

Watchdog Configuration for a System That "Sleeps" for Extended Time Periods

US 6,996,732 B2

METHOD OF AND APPARATUS FOR ACHIEVING "WATCH DOG" FUNCTIONS IN MICROCONTROLLERS AND MICROCOMPUTERS AND THE LIKE, REQUIRED TO SHUT DOWN FOR EXTENDED PERIODS OF TIME FOR ENERGY-CONSERVATION PURPOSES

FIELD OF INVENTION

The present invention is concerned with "watchdog" timers and the like for use in microcontrollers and microcomputer electronic and similar equipments (hereinafter generically termed "microcomputers") that are required to be shut down for extended time periods as for energy conservation purposes and the like.

BACKGROUND

If a microcomputer or the like is required to be shut down for extended periods of time for energy conservation, an external "timer" circuit ("sleep timer") is generally used to generate a "wake up" signal at the end of the shut down period. This "wake up" causes the microcomputer to restart, continuing to execute its program from the point at which it shut down to conserve energy, rather than resetting to the beginning of its program.

When a microcomputer is so required to shut down for extended periods of time for energy conservation, however, it becomes impractical to implement a typical type of "watchdog" timer because such require frequent activity to prevent them from generating a reset which resets the microcomputer program to its beginning, and which, indeed, is only desired in the event that the microcomputer has actually failed. Such restart at the end of such shut down, is effected by the before-mentioned sleep timer.

Microcomputers and microcomputers used in embedded systems occasionally fail to operate normally for various reasons, ranging from unintended software defects to electronic noise. When they fail, there is no one around to restart them, as one starts a desktop computer when it crashes. For this reason, watchdog timers are often used, being capable of resetting the microcomputer if it is not itself reset within a certain period of time. The microcomputer is usually programmed to reset the watchdog timer, and does this so long as it is operating normally. If it fails, however, the watchdog timer eventually goes off and rights the situation. The watchdog timer may be part of the microcomputer chip itself, or it may be an external device.

This approach becomes impractical, however, if a microcomputer is required to shut down and remain idle for relatively long time intervals (e.g. minutes) between occasional periods of activity, in order to conserve battery power or some other limited power supply, as described, for example, in U.S. Pat. No. 6,229,988 issued May 8, 2001. Watchdog timers in such applications usually must indeed be reset every two seconds or so; or even more often.

It is to the solution of such problems that the present invention is primarily directed through a novel use of clocking signals.

OBJECTS OF INVENTION

A principal object of the invention, therefore, is to provide a new and improved method of and apparatus for "watchdog" functions for microcomputers or similar processors and the like that is not subject to the above-described and other limitations of prior approaches, but that, to the contrary, is particularly adapted for microcomputers and the like that are required to be shut down for extended periods of time as for energy conservation and similar purposes.

A further object is to provide a novel independent clocking technique for such watchdog control and for use more generally, as well.

Other and further objects will be explained hereinafter and are more particularly delineated in the appended claims.

SUMMARY

In summary, from one of its viewpoints, the invention embraces in a microcomputer system wherein a watchdog circuit will generate a microcomputer reset signal at a periodic rate in the absence of timely input signal activity at the watchdog circuit, but wherein the system is required to shut down or sleep for extended periods of time as for energy conservation until a wake-up signal is asserted to restart the microcomputer, a method of modified watchdog circuit operation, that comprises, generating an independent substantially rectangular-wave signal to the watchdog circuit of period less than said periodic rate; applying the rectangular-wave signal to the watchdog circuit, including during the microcomputer sleep period, to inhibit its generation of a microcomputer reset signal; and, upon the assertion of a wake-up signal, terminating the application of the rectangular-wave signal to the watchdog circuit until the normally operating microcomputer causes the wake-up signal to be de-asserted, thereby reapplying the rectangular-wave signal to the watchdog circuit.

Preferred and best mode designs and details are hereinafter presented.

DRAWINGS

The invention will now be explained in connection with the accompanying drawing, the single FIGURE of which is a combined block and schematic diagram illustrating an exemplary, though preferred, watchdog configuration particularly, though not exclusively, adapted for a microcomputer system or the like that "sleeps" for extended time periods as for energy conservation purposes.

DESCRIPTION OF PREFERRED EMBODIMENT

In prior watchdog configurations, the microcomputer or processor software generates a signal sufficiently frequently to prevent the watchdog from timing out—a timeout causing some level of system reset to get the system running again. As before discussed, however, with the microcomputer system going to sleep to save power, some other solution is needed. The FIGURE illustrates a preferred solution wherein an independent rectangular-wave clocking signal is provided which prevents the watchdog from timing out, including while the microcomputer system is asleep.

Referring to the FIGURE, a microcomputer or the like is shown at M operating, in accordance with the invention, with an external wake-up timer WT, controlled from the microcomputer by a timer control, so-labeled, that normally provides a wake-up signal to the microcomputer M in accordance with the intended sleep cycle of the equipment, as described, for example, in the earlier-referenced patent and systems therein described and referenced.

A preferably rectangular-wave clock signal from an oscillator O is gated at G and allowed to pass through to a watchdog circuit WC connected to a reset terminal of the microcomputer M. Only when the wake-up signal that is intended to wake up the idle or shut-down or "sleeping" microcomputer is not asserted, is the gated clock signal allowed to pass through to the watchdog circuit WC, as will now be more fully explained.

The watchdog circuit WC is a timer circuit constructed to count a specified period of time, at the end of which it will generate an output that will reset the microcomputer M to which it is connected. This timer circuit can itself be "reset", to start counting again from the beginning, by a signal at its input, in some cases by a specific state change of the input signal, and in other cases by any state change of the input signal.

In a preferred implementation of the invention, the watchdog circuit WC is part of a multi-function "supervisory" integrated circuit (such as part of an SP805 component from Sipex Corporation) that provides several monitoring functions for the microcomputer. This watchdog circuit timer will count for approximately 1.5 seconds and will then generate a reset signal to the microcomputer. Said count will reset to the beginning, however, at any time that a signal applied to its input changes state (changes from high to low or from low to high). The microcomputer will therefore normally be reset only in the event that the predetermined time interval 1.5 seconds elapses without a state change at the input to the watchdog circuit WC.

In order to ensure that the signal at the input to the watchdog circuit WC will continue to change state, and thus continue to reset the watchdog timer during the extended time periods that the microcomputer is shut down for energy conservation, the before-mentioned independent, continuously-operating oscillator circuit O is used to generate a rectangular-wave signal. This rectangular-wave signal is connected to the input of the watchdog circuit WC, through the previously mentioned gate/switch G, which may be implemented as a logic gate. The rectangular-wave signal is generated with a period that is a small fraction of the 1.5 seconds, so that the watchdog timer never counts very far while the rectangular-wave input is connected to it by the gate G, thus inhibiting reset of the microcomputer.

In the preferred embodiment, the wake-up timer WT is a PCF8593 Real-Time-Clock from Philips Semiconductor. It is instructed by the microcomputer M to count for a period of time and then generate an "alarm" output, which then remains asserted until the microcomputer instructs the wake-up timer WT ("Timer Control") to de-assert it and to start counting towards the next wake-up alarm. The alarm output, which is used to restart the microcomputer, is also used to control the gate switch G that connects the rectangular-wave oscillator O to the input of the watchdog circuit WC, such that the rectangular-wave signal is connected to the watchdog circuit when the wake-up alarm output is not asserted, and is disconnected or terminated from the watchdog circuit when the wake-up alarm output is asserted.

When the microcomputer M is operating normally, the rectangular-wave signal from the oscillator O is disconnected from the watchdog circuit WC whenever the wake-up alarm is asserted to restart the microcomputer; and it is reconnected quickly when the microcomputer instructs the wake-up timer WT to de-assert the wake-up alarm signal.

If, however, microcomputer M should not be operating normally, the wake-up timer WT is not instructed to de-assert the alarm signal and the rectangular-wave signal remains disconnected from the watchdog circuit WC. After 1.5 seconds has elapsed, the watchdog circuit WC, as before explained, generates a reset signal to the microcomputer.

As earlier mentioned, while shown applied to the periodically "sleeping" microcomputer type of system, the technique is also more generally useful, and further modifications will also occur to those skilled in this art, such being considered to fall within the spirit and scope of the invention as defined in the appended claims.

What is claimed is:

1. In a microcomputer system wherein a watchdog circuit will generate a microcomputer reset signal after the elapse of a predetermined time interval with no signal state change at the input of the watchdog circuit, but wherein the system is required to shut down or sleep for extended periods of time as for energy conservation until a wake-up signal is asserted to restart the microcomputer, a method of modified watchdog circuit operation, that comprises, generating an independent substantially rectangular-wave signal of period less than said predetermined time interval; applying the rectangular-wave signal to the watchdog circuit, including during the microcomputer sleep period, to inhibit its generation of a microcomputer reset signal; and, upon the assertion of a wake-up signal, terminating the application of the rectangular-wave signal to the watchdog circuit until the normally operating microcomputer causes the wake-up signal to be de-asserted, thereby reapplying the rectangular-wave signal to the watchdog circuit.

2. In a microcomputer system wherein the system is required to shut down or sleep for extended periods of time as for purposes of energy conservation, and in which an external wake-up timer is provided to generate a wake-up signal at the end of the shut-down period, a method of providing watch-dog timer functions during the microcomputer extended sleep periods with a watchdog timer that would normally generate a microcomputer reset signal after the elapse of a predetermined time interval with no signal state change at the input of the watchdog timer, the method comprising, applying a signal-state changing substantially rectangular-wave signal to said input of the watchdog timer of period a fraction of said predetermined time interval, and during said extended microcomputer sleep period, thereby inhibiting such microcomputer reset signal generation; and, upon assertion of a wake-up signal from said wake-up timer at said end of the shut down period, terminating the application of the rectangular-wave signal at said input of the watch-dog timer until normal operation of the microcomputer causes the de-assertion of said wake-up signal.

3. In a microcomputer system wherein a watchdog circuit will generate a microcomputer reset signal in the absence of timely input signal activity at the watchdog circuit for a predetermined time interval, but wherein the system is required to shut down or sleep for extended periods of time as for energy conservation until a wake-up signal is asserted to restart the microcomputer, apparatus for modifying the watchdog circuit operation, that comprises, a generator of substantially rectangular-wave signals of period less than said predetermined time interval; means for applying the rectangular-wave signal to the watchdog circuit, including during the microcomputer sleep period, to inhibit the watchdog circuit generation of a microcomputer reset signal; and means for terminating the application of the rectangular-wave signal to the watchdog circuit until the normally operative microcomputer causes the wake-up signal to be de-asserted, and for thereupon reapplying the rectangular wave signal to the watchdog circuit.

4. In a microcomputer system wherein the system is required to shut down or sleep for extended periods of time as for purposes of energy conservation, apparatus having, in combination, a wake-up timer provided to generate a wake-up signal at the end of the shut-down period; a watchdog timer that normally generates a microcomputer reset signal after the elapse of a predetermined time interval with no signal state change at the input of the watchdog timer; means for applying a signal-state changing rectangular-wave signal to the input of the watchdog timer period of a fraction of said predetermined time interval, and during said extended microcomputer sleep period, thereby inhibiting such microcomputer reset signal generation; and means operable upon assertion of a wake-up signal from said wake-up timer at said end of the shut-down period, for terminating the application of the rectangular-wave signal at said input of the watchdog timer until normal operation of the microcomputer causes the de-assertion of said wake-up signal.

5. A watchdog timer circuit having, in combination, a reset signal generator for a microcomputer system; means for modifying said reset signal generator to inhibit reset signal generation during periods of microcomputer shut-down or sleeping, as for energy conservation purposes, comprising an independent external rectangular-wave signal generator connected to the watchdog circuit for inhibiting watchdog reset signal generation for the microcomputer during such shut-down periods and until a wake-up signal is generated at the end of such microcomputer sleeping; and means for thereupon disconnecting the application of the rectangular-wave signals to the watchdog circuit until normal operation of the microcomputer causes the de-assertion of said wake-up signal.

6. The watchdog timer circuit of claim 4 wherein the predetermined time interval for reset signal generation by the watchdog circuit is about 1.5 seconds, and the period of the rectangular-wave signal is a fraction thereof so as to produce input signal state changes at the watchdog circuit well within said 1.5 seconds to inhibit reset signal generation.

* * * * *